Patented July 28, 1931

1,815,930

UNITED STATES PATENT OFFICE

EMIL E. NOVOTNY, OF LOGAN, PHILADELPHIA, AND CHARLES J. ROMIEUX, OF WEST PHILADELPHIA, PENNSYLVANIA, ASSIGNORS TO JOHN STOGDELL STOKES, OF HUNTINGDON VALLEY POST OFFICE, PENNSYLVANIA

CONDENSATION PRODUCT OF PHENOLS AND STARCHES

No Drawing. Application filed October 19, 1923. Serial No. 669,617.

This invention relates to the manufacture of condensation products of phenols and starches, the end point of this reaction resulting in products of a resinous nature. Moreover, these condensation products are formed without the intermediary of a catalyst, therefore resulting in products which are free from objectionable extraneous substances.

We are aware of the fact that it is already well known in this art that condensation products can be produced through the reaction of phenol on starch and sugar, as shown in the Austrian patents to the Badische Anilin & Soda Fabrik, Patents No. 69,375 and No. 69,377, both issued January 15, 1915. However, both these patents indicate the use of large quantities of mineral acids as condensing agents and the object of these inventions is for the purpose of preparing tanning materials. We find that for the purpose of producing condensation products of phenols and starches the presence of a catalyst is not essential nor desirable.

Where these condensation products are to be used for the purpose of molding in or between metal dies, the catalytic agents will be injurious to such equipment and the finished product will suffer as they will tend to increase moisture absorption and decrease dielectric strength. As these products when fully combined are heavy and viscous, it is a very difficult matter to remove or neutralize such extraneous substances from them without a considerable amount of effort and expense. As a matter of fact, it is practically impossible to determine precisely the quantity of such substances present because of the physical properties of the material and the fact that side reactions take place whereby the catalytic agents combine with or are destroyed by the reacting mass, resulting in various undesirable products. One of the undesirable products that may be obtained is finely divided carbon, which is extremely difficult to remove and which has a very deleterious effect upon the dielectric properties of the final product.

The condensation products of phenols and starches by our methods are produced through the intermediary of a high temperature, preferably in an inclosed pressure resisting container. The temperature at which the condensation takes place is preferably between 400 and 500° F., at which temperature considerable pressure is built up within the container. The resulting product may be a liquid, semi-solid, or solid, depending upon the temperature used and the length of time the reaction is permitted to continue. Furthermore, when these products are freed from excess phenol in any well known manner, as by distillation, they are potentially reactive without the admixture of any other material, while, moreover, the products having a large quantity of excess phenol will be fusible; i. e., may be remelted repeatedly without becoming infusible.

These products are valuable for use in plastic molding and more particularly for use where a quick, thermo-setting, resinous product is desirable. They make excellent solutions with various organic solvents such as alcohol, acetone, ether, furfural, etc., and in this condition may be used as surfacing materials or may be impregnated into various fibrous materials such as paper, cloth, cellulose, wood flour, etc., or may be mixed with inorganic fillers and suitable pigments and colors.

The liquid or solid products may be mixed with or without the use of solvents, with suitable fillers, colors, lubricants or plasticizing agents to produce molding materials or mixtures which may be shaped under heat or heat and pressure into various shapes and forms.

Although these products of themselves react to infusibility upon heating from 1 to 10 hours at temperatures of from 250 to 500° F., the speed of the reaction can be greatly accelerated when they are in the presence of suitable hardening or accelerating agents. The most suitable are the aldehydes or materials capable of engendering aldehydes such as, for example, formaldehyde, furfural, hexamethylenetetramin, or combinations of formaldehyde and ammonia or other materials having methylene groups in condition to combine, such as anhydroformaldehyde-aniline. It might also be stated that acids, bases, neutral acid and alkaline salts, when used in small amounts, have an accelerating action on these condensation products.

Various plasticity agents such as solid solvents or lubricants of a liquid or solid nature may be mixed therewith, such, as for example, camphor, paraffin, lanolin, or paraffin oil.

The proportion of reacting materials as before stated may be varied considerably inasmuch as free phenol may readily be removed, and therefore it is not essential that the specific amounts of material given below in the illustrative example must be precisely followed. So that our invention may be better understood, the following procedure is shown by example:

A mixture of 100 pounds of commercial corn starch and 150 pounds of commercial crystalline phenol are placed in a pressure resisting container which is heated to a temperature of 480° F. for a period of 2 to 3 hours. The pressure is then gradually released, allowing any uncombined phenol to escape into a suitable condenser. Should there be any more free phenol remaining in the product it may be readily removed by applying heat to the container connected to a condenser. When the uncombined phenol has been removed, a hard, brownish black, lustrous, high melting resin is obtained. By cooking for a shorter period in the kettle thin liquid products are obtained, whereas with the proper amount of phenol infusible products may be obtained by continuing the cooking under pressure for a longer period. To prove definitely that the reaction above described is produced in the absence of a catalyst, we have carried out the reaction in a glass lined autoclave with redistilled, highly purified phenol and the purest grade of starch obtainable.

To render the products very thermo reactive, they may be mixed or combined with formaldehyde solution or the dry polymers of formaldehyde. Where very high melting products are to be treated, they may previously be dissolved in suitable amounts of solvent such as alcohol. We have found it preferable to actually combine these accelerating agents with the condensation products previous to their final reaction. Where it is desired to increase further the reactivity, small amounts of ammonia may be introduced together with the formaldehyde, but we find it preferable not to substitute hexamethylenetetramin in whole for the formaldehyde since it is undesirable to obtain final products high in nitrogen. We prefer to employ formaldehyde as an accelerating agent as it enters into a definite combination with the starch phenol condensation product. However, other aldehydes such as furfural or acetaldehyde may be employed in the place of the formaldehyde. Furfural may be employed both as solvent and accelerator. Thus, we find it possible to dissolve the condensation products in small quantities of furfural, mix the furfural paste with suitable fillers so as to obtain a plastic material which may be pressed either hot or cold and subsequently hardened by heating at relatively low temperatures for a number of hours.

More specifically, in employing formaldehyde as an accelerating agent, the following procedure may be followed:

To 100 pounds of a syrupy condensation product of starch and phenol we add 20 pounds of commercial formaldehyde solution. The resulting solution is heated to a gentle boil under a reflux condenser for about 2 hours. If desired, it may then be cut with alcohol and employed as a solution for impregnation as is well known in the art. This boiling process causes the formaldehyde to actually combine with the condensation product, with the result that the final infusible products possess exceptional mechanical and electrical properties. These products are now extremely reactive at higher temperatures and will, at temperatures of from 250 to 350° F., react within 2 minutes to 60 minutes into hard, infusible products, depending upon the temperature they are subjected to and the particular shape of the mass being so hardened. The combined action of heat and pressure shapes and sets the products simultaneously to their hard, set and infusible form.

In using the term "starch or similar carbohydrates," we wish to include the various forms of starch as corn starch, wheat starch, and the like, as well as other carbohydrates which are related to starch such as dextrin, dextrose, levulose, and the like, which are related to starch with respect to their ability to form resins with phenol, substantially under the condition as set forth.

In using the term "a phenol" we wish to include bodies in which characteristic phenolic properties predominate, as in the phenols, cresols, napthols, and di- and tri-hydroxybenzenes and napthalenes. No claim is made to such compounds as trinitro phenol, phenol sulphonic acid and the like.

Wherein the term "hardening agent" is used, we mean reactive methylene compounds such as hexamethylenetetramine, and furfuramide, and active aldehyde compounds such as furfural and formaldehyde, capable of bringing about the hardening or curing reaction substantially as described.

Wherein we use the term "an aldehyde" we mean an aldehyde such as furfural or formaldehyde which is capable of bringing about the hardening or curing reaction as described.

The term "methylene containing hardening agent" is used to designate such compounds as hexamethylenetetramine and hydrofuramide which are capable of hardening the resin to an infusible state when used as described.

It is well known that starch alone heated to the temperatures obtained by our method may be decomposed into dextrine, hence it is possible that dextrine is first formed in our process and is subsequently reacted upon by the phenols. Wherein we have used the term furfural we wish it to include as well its homologues or substituted products.

What we claim is—

1. The herein described method, which consists in heating a mixture of a phenolic body and a starch in the absence of a catalyst at a temperature in the range of 400° F. to 500° F. to produce a resinous reaction product.

2. The herein described method, which consists in heating a mixture of a phenol and a starch in the absence of a catalyst at a temperature in the range of 400° F. to 500° F. to produce a resinous reaction product, and then adding a hardening agent thereto.

3. The herein described method which consists in producing a condensation product of a phenol and a starch or similar carbohydrate, without a catalyst by subjecting the same to heat at a temperature above 212°, and adding a methylene containing hardening agent.

4. The herein described method of producing a condensation product which consists in subjecting a phenol and a starch without a catalyst to heat at a temperature above 212°, and adding an aldehyde containing an active methylene group capable of acting as a hardening agent.

5. The herein described method which consists in producing a condensation product of a phenol and a starch or similar carbohydrate, by heating these materials in a closed vessel, in the absence of a catalyst, at such a temperature as to generate pressure by means of their own vapors or vapors of products liberated during the reaction.

6. The herein described method which consists in producing a condensation product of a phenol and a starch or similar carbohydrate, by reacting these materials in a closed vessel in the absence of a catalyst, at such a temperature as to generate pressure by means of their own vapors, or the vapors of products liberated during the reaction, and removing therefrom the free and unreacted phenol after the pressure has been released.

7. The herein described method which consists in producing a condensation product of a phenol and a starch or similar carbohydrate, by reacting these materials in a closed vessel, in the absence of a catalyst, at such a temperature as to generate pressure by means of their own vapors or vapors liberated during the reaction, and combining with this condensation product an aldehyde containing an active methylene group as a hardening agent after the free phenol has been removed.

8. The herein described method which consists in producing a condensation product of a phenol and a starch or similar carbohydrate, by reacting these materials in a closed vessel in the absence of a catalyst, at such a temperature as to generate pressure by means of their own vapors or vapors liberated during the reaction; then after the free phenol has been removed, combining with this condensation product an aldehyde containing an active methylene group as hardening agent, and adding a solvent thereto.

EMIL E. NOVOTNY.
CHARLES J. ROMIEUX.